US006027239A

United States Patent [19]
Ghassaei

[11] Patent Number: 6,027,239
[45] Date of Patent: Feb. 22, 2000

[54] ON-BOARD ENGINE TRIM BALANCE DISPLAY AND INTERFACE

[75] Inventor: Saeid Ghassaei, Laguna Niguel, Calif.

[73] Assignee: Endevco Corporation, San Juan Capistrano, Calif.

[21] Appl. No.: 08/846,299

[22] Filed: Apr. 30, 1997

[51] Int. Cl.⁷ .................................................. G06F 17/00
[52] U.S. Cl. .................... 364/528.14; 364/188; 364/174; 364/176; 244/1 N; 73/462; 73/660; 73/457
[58] Field of Search ............................... 364/550, 528.14, 364/188, 172, 173, 174, 175, 176–179, 574; 702/56; 73/583, 659, 660, 462–465, 457, 458; 244/1 N

[56] References Cited

U.S. PATENT DOCUMENTS

| | | | |
|---|---|---|---|
| 3,952,612 | 4/1976 | Kurkowski et al. | 74/573 R |
| 4,238,960 | 12/1980 | Curtis et al. | 73/462 |
| 4,448,059 | 5/1984 | Kondo et al. | 73/35 |
| 4,485,678 | 12/1984 | Fanuele | 73/660 |
| 4,488,240 | 12/1984 | Kapadia et al. | 364/508 |
| 4,510,809 | 4/1985 | Fillion | 73/457 |
| 4,608,650 | 8/1986 | Kapadia | 364/508 |
| 4,935,846 | 6/1990 | Karolys et al. | 364/508 |
| 4,977,503 | 12/1990 | Rudnick et al. | 361/395 |
| 5,257,244 | 10/1993 | Thinsen | 368/41 |
| 5,434,626 | 7/1995 | Hayashi et al. | 348/569 |
| 5,566,092 | 10/1996 | Wang et al. | 364/551.02 |

FOREIGN PATENT DOCUMENTS

0577159A1  3/1993  European Pat. Off. .

OTHER PUBLICATIONS

"Component Maintenance Manual" Oct. 15, 1995.
"Component Maintenance Manual" Oct. 1, 1996.
"Design Guidance For Avionic Equipment" Oct. 30, 1996.

*Primary Examiner*—William Grant
*Assistant Examiner*—Ramesh Patel
*Attorney, Agent, or Firm*—Hamilton, Brook, Smith & Reynolds, P.C.

[57] ABSTRACT

A display and user interface incorporated into an on-board engine vibration monitoring and trim balance system. The interface consists of an alphanumeric display and a number of push buttons integrally formed with a front panel of the system. The user operates the interface to obtain and alter information pertaining to engine vibration data, engine trim balance solutions, and balance part configurations. Push buttons are used to scroll through an elaborate menu structure for receiving information and making selections among various available functions. The menu structure may in particular provide for the user to review particular installed balance part location data prior to asking the system to compute an optimum balance solution. Once the balance solution is calculated, the user may review a list of balance parts to be removed from and installed on the engine.

18 Claims, 13 Drawing Sheets

POSSIBLE SHOP FAULTS:

| | |
|---|---|
| TMS RAM FAILED | OR TMS RAM PASSED |
| TMS ERROR FAILED | OR TMS EPROM PASSED |
| LO TACH FILTER FAILED | OR LO TACH FILTER PASSED |
| HI TACH FILTER FAILED | OR HI TACH FILTER PASSED |
| LO TRACH FILTER FAILED | OR LO TRACK FILTER PASSED |
| HI TRACK FILTER FAILED | OR HI TRACK FILTER PASSED |

SELF TEST

FLIG HT HISTORY MENU

ENGINE TRIM BALANCE MENU

ON-BOARD ENGINE TRIM BALANCE DISPLAY AND INTERFACE

BACKGROUND

Most modern commercial aircraft make use of high bypass jet engines that include a number of rotating fan elements. The rotating fan elements include low speed rotating components, such as used in compressor bearings, as well as high speed rotating components, such as used in turbines. Unfortunately, during in-flight operation both the low speed rotating system and the high speed rotating system can introduce unwanted engine vibrations. Reduction of engine vibrations is important for a variety of reasons. During in-flight operation, engine vibration may result in excessive cabin noise. The cabin noise and/or resulting introduction of physical vibrations into the body of the aircraft may in turn cause passenger and crew discomfort. Over the long term, such engine vibrations can significantly increase the maintenance costs and reduce the life cycle of a jet aircraft.

Engine vibrations are typically created by small variations in the fan blade configurations which cause an imbalance in the rotating systems. As such, it has been known for some time that balancing techniques can be used to reduce engine vibrations. Using these techniques, which are quite analogous to the balancing of an automobile tire, weights of a specific mass are placed at specific locations In the rotating system. By carefully placing such weights engine vibration can be reduced considerably.

In order to determine the specific locations and weights required to balance a jet engine there have been developed a line of instrumentation units known variously as airborne vibration monitoring systems. The primary purpose of these systems is to measure and record engine vibration levels, as detected from analog vibration signals produced by engine mounted accelerometers. Vibration signals may be gathered during an engine balancing operation on the ground or in other instances may be taken during in-flight operations. Vibration amplitudes are typically recorded in narrow frequency bands synchronous with signals indicated by engine speed tachometers.

In fact, a number of sophisticated computer and digital signal processing systems have been developed for processing the accelerometer and tachometer signals for high accuracy solution of the balance equation. These systems are not entirely satisfactory however. In particular, although they may accurately measure in-flight vibration data and rapidly calculate a balance solution, they typically require access to a separate computer terminal or portable personal computer. It is, however, logistically difficult for maintenance personnel who are typically working in an aircraft hangar or along an active airport runway to locate, set up, and use such equipment effectively. The environment is dirty, noisy, hectic, and may be exposed to the weather. Such an environment is therefore not typically conducive to the effective use or even the easy availability of separate computer equipment. It is desirable, therefore, for such a system to take into account the physical working conditions of the personnel who are most often expected to use the equipment.

Furthermore, existing systems typically calculate a balance solution and then display this as a raw indication of phase angle and the size of the weight required. However, it is common for weights to already be installed on certain fan blades. It would therefore also be desirable if such a system took into account the typical information requirements of engine maintenance personnel.

The system should in particular consider that maintenance personnel may not always be prepared to easily deal with a raw mathematical solutions, and would rather prefer to be instructed what to do in a way in which they most often think, which is in terms of mechanical part installation and configurations.

SUMMARY OF THE INVENTION

Briefly, the invention is a display and user interface incorporated into an on-board engine vibration monitoring and trim balance system. The user operates the interface to obtain and alter information pertaining to engine vibration data, engine trim balance solutions, balance part configurations, and self test procedures.

The interface consists of an alphanumeric display and a number of push buttons integrally formed with a front panel of the engine vibration monitoring system. System information and menu prompts are illustrated on the alphanumeric display. The push buttons are used to scroll through an elaborate menu structure for receiving information and making selections among various available functions. The menu structure may in particular provide for the ability of the user to review particular installed balance part location data prior to asking the system to compute an optimum balance solution.

Once the balance solution is calculated, the interface permits the user to methodically review a list of balance parts to be removed from and then a list of parts to be installed on the engine.

There are several advantages to the invention. Data collected during flight is readily available to the user by operating the integral display and user interface. Thus, no additional equipment such as laptop computers or the like need to be obtained and connected to the aircraft. The user simply activates the device and performs the balance procedure. An engine balance procedure can thus be easily performed at any time and at any location, regardless of the availability of other equipment.

Furthermore, by allowing the user to review and change a stored list of balance parts and part locations prior to initiating the balance solution process, the user may confirm that the system has the proper configuration information in its memory prior to the calculation of a balance solution. The user may then be instructed with the specifics of how to implement the solution, by being prompted to remove and then to add a precise list of balance parts.

It will be understood that the particular method and device embodying the invention are shown by way of illustration and not as a limitation, and that the principles and features of this invention may be employed in various and numerous embodiments without departing from its scope.

BRIEF DESCRIPTION OF THE DRAWINGS

The above and other features of the invention, including various novel details of construction and combinations of parts and other advantages, will now be more particularly described with reference to the accompanying drawings, in which.

DETAILED DESCRIPTION OF PREFERRED EMBODIMENTS

Figure 1:
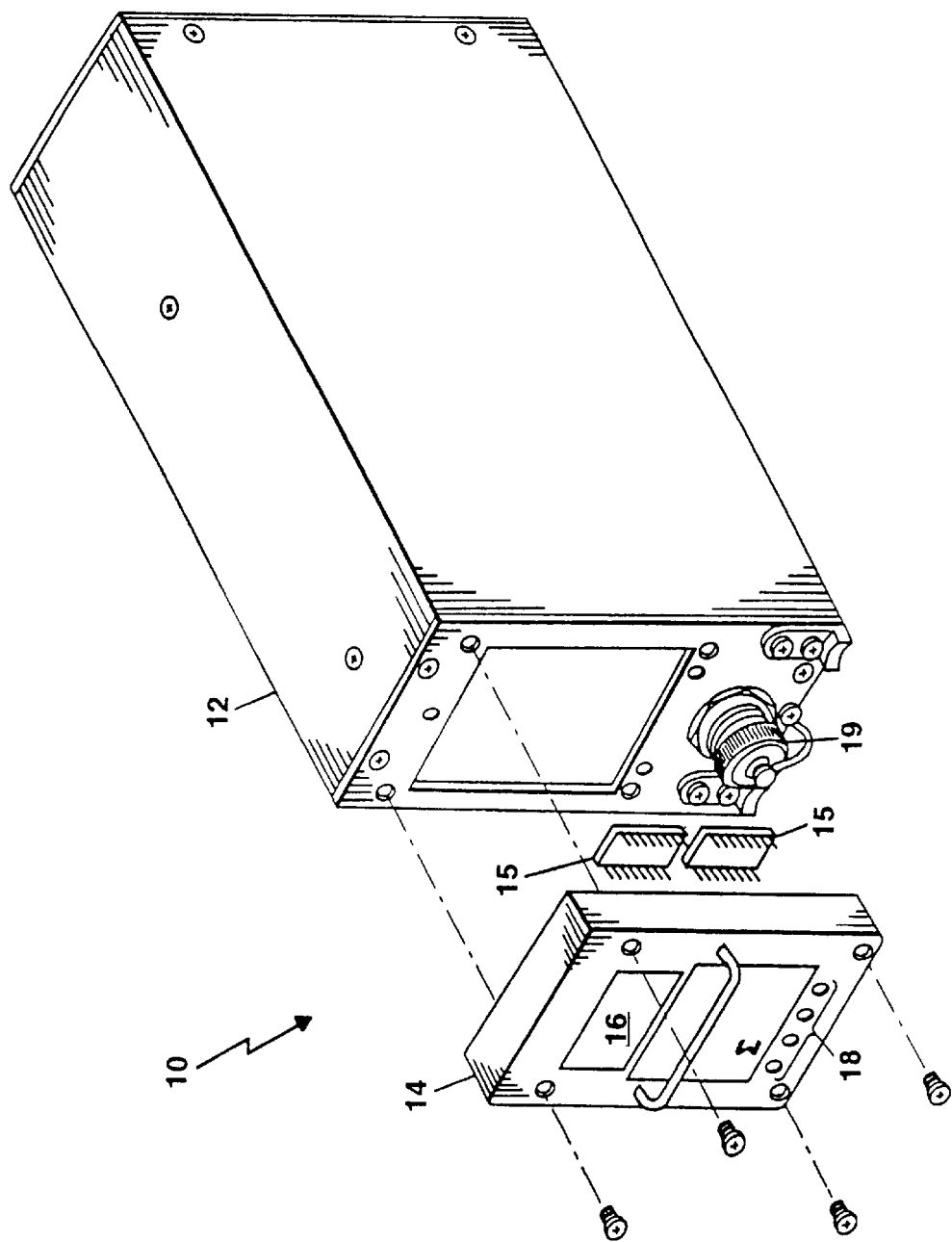
FIG. 1 is a pictorial view of an engine vibration monitoring and trim balance system according to the invention.

Turning attention now to the drawings, FIG. 1 illustrates an isometric view of an engine vibration monitoring system 10 according to the invention. The engine vibration monitoring system 10 measures and records the vibration level associated with one or more aircraft engines. In order to accomplish this, the system 10 processes analog vibration signals received from engine mounted accelerometers. The accelerometer signals are measured at specific amplitudes in a narrow bandwidth synchronous with signals received from engine speed tachometers. The present invention is in the manner of implementing a display 16 and user interface 18 for operating the system 10. However, before proceeding with a detailed description of the display 16 and user interface 18, various other components of the system 10 will be described.

The engine vibration monitoring system 10 consists of a signal processor module 12 and a personality module 14. The signal processor module 12 is primarily responsible for measuring and recording accelerometer and tachometer signals that indicate the vibration level of aircraft engines. For example, signals may be received from a first accelerometer that senses a compressor bearing vibration and a second accelerometer that senses a turbine vibration for each engine. Since the compressors and turbines introduce different vibrations when rotating at different speeds, these rotational-speed-dependent devices are also sensed by respective tachometers. The signal processing module 12 typically contains generic signal conditioning and digital signal processing circuits that are common for all aircraft and engine installations.

The personality module 14 contains circuits specific to particular aircraft and engine installations. These circuits may take the form of electrically programmable read-only memories (EPROMS) 15 that are inserted to the personality module 14 prior to installing the personality module 14 in the system 10.

The manner in which the signal processor module 12 may be used to detect and process such vibration signals is well known in the art, being described in various issued patents including U.S. Pat. No. 4,935,846 issued to Karolys et al., U.S. Pat. No. 4,488,240 issued to Kapadia et al., U.S. Pat. No. 4,608,650 issued to Kapadia et al., and European Patent Application 0 577 159 A1.

The present invention is therefore in the specific manner in which the display 16 and interface 18 are used to review vibration data as necessary in order to perform engine trim balance operations in-flight or on-ground. In particular, vibration data provided by the signal processor module 12 is first presented to the personality module 14. The personality module then performs engine trim balance calculations, including a one-plane or two-plane balance solution, as requested by the user via the interface 18. A microprocessor located in the personality module 14 may use imbalance data from a last flight leg or last engine ground run to calculate these trim balance solutions using a generic balance coefficients database. The balance solutions are then reviewed by the user in the form of a list of parts to be removed from and to the engines. The list is presented on the display 16 and manipulated via the interface 18 in a particular manner which will be described in further detail below.

The system 10 may also provide vibration data in the form of analog or digital signals via a front panel connector 19 which carries signals in accordance with an ARINC 429 standard serial data bus. The signals provided at the connector 19 are typically used for interfacing the system 10 to other aircraft maintenance equipment.

Figure 2:
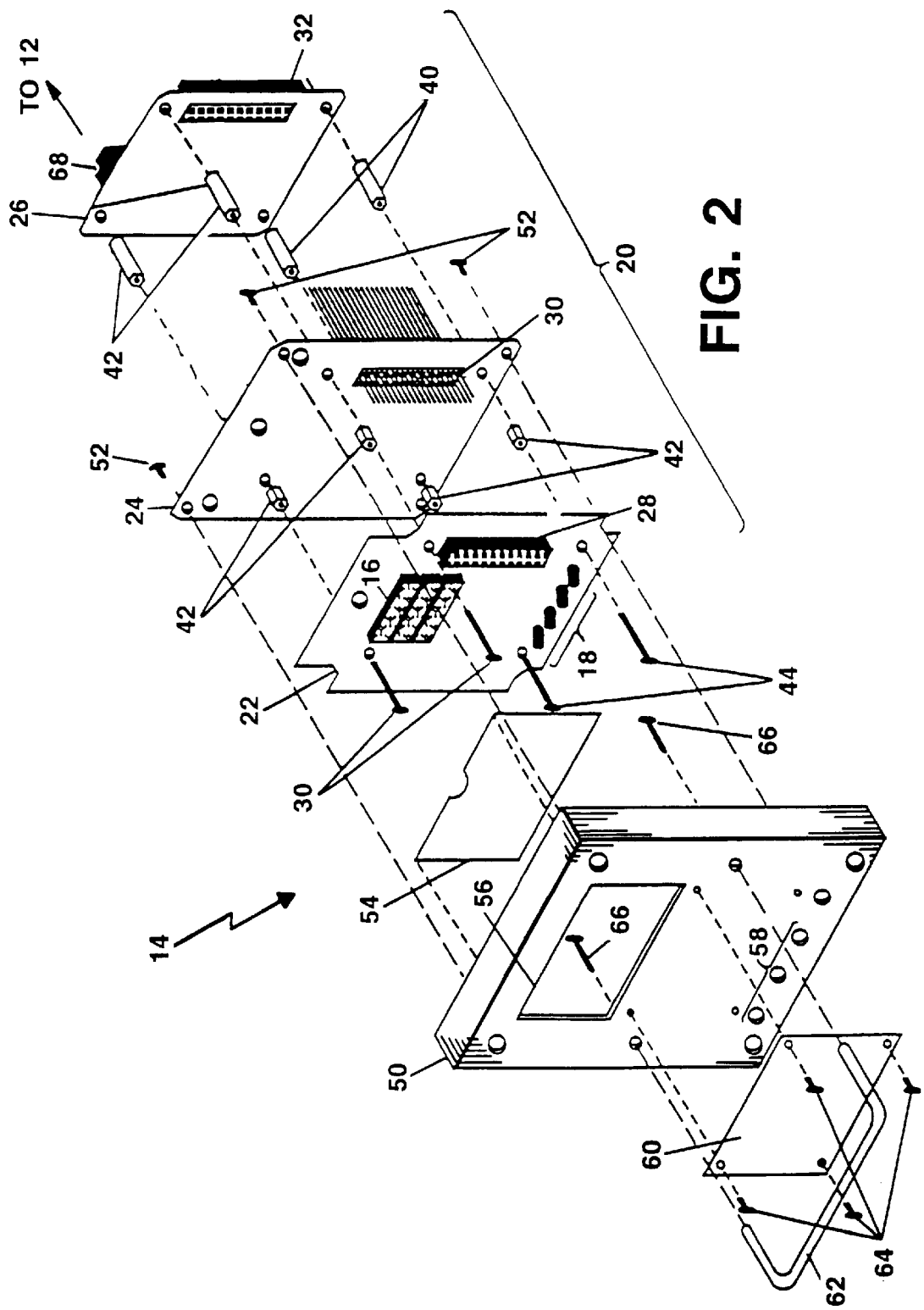
FIG. 2 is an exploded view of a personality module that incorporates a display according to the invention.

FIG. 2 shows one preferred embodiment of the personality module 14, display 16, and interface 18 more particularly. The personality module 14 consists primarily of a circuit board assembly 20 comprising three circuit boards, including a display circuit board 22, a trim balance circuit board 24, and an interface circuit board 26. Electrical signals are passed between the circuit boards in the assembly 20 using a set of pass through connectors 28, 30, and 32. The circuit boards are kept spaced apart by various standoffs 40 and 42 as well as pan-head screws 44.

The circuit board assembly 20 is in turn mounted to a front panel 50 such as by screws 52. An optical viewing filter 54 may be disposed between the circuit assembly 20 and front panel 50 for reducing glare when viewing the display 16 through the front panel 50. A suitably shaped hole 56 is formed in the front panel 50 so that the display 16 may be viewed therethrough. Other holes 58 formed in the front panel 50 allow the user to access the interface activators in the form of push buttons 18. An identification label 60 and handle 62 may also be attached to the front panel 50 by mounting screws 64 and 66.

The display circuit board 22 serves primarily as a mounting surface for the display 16 and associated integrated circuits (not shown). In addition, the push buttons 18, of which there are four, are also mounted on the display circuit board 22.

The trim balance circuit board 24 contains a number of integrated circuit components (not shown in FIG. 2) associated with trim balance functionality. In particular, these include microprocessors and other integrated circuits such as random access memory (RAM), electrically programmable read-only memory (EPROM), and/or electrically erasable programmable read-only memory (EEPROM) as described in detail in connection with FIG. 3.

The interface circuit board 26 principally serves as a device for mounting the EPROMs 15 that provide for personalization of the signal processing unit 12. This interface circuit board 26 contains a connector 68 that mates with a like connector in the signal processor unit 12 for passing engine vibration signals to the personality module 14.

Figure 3:
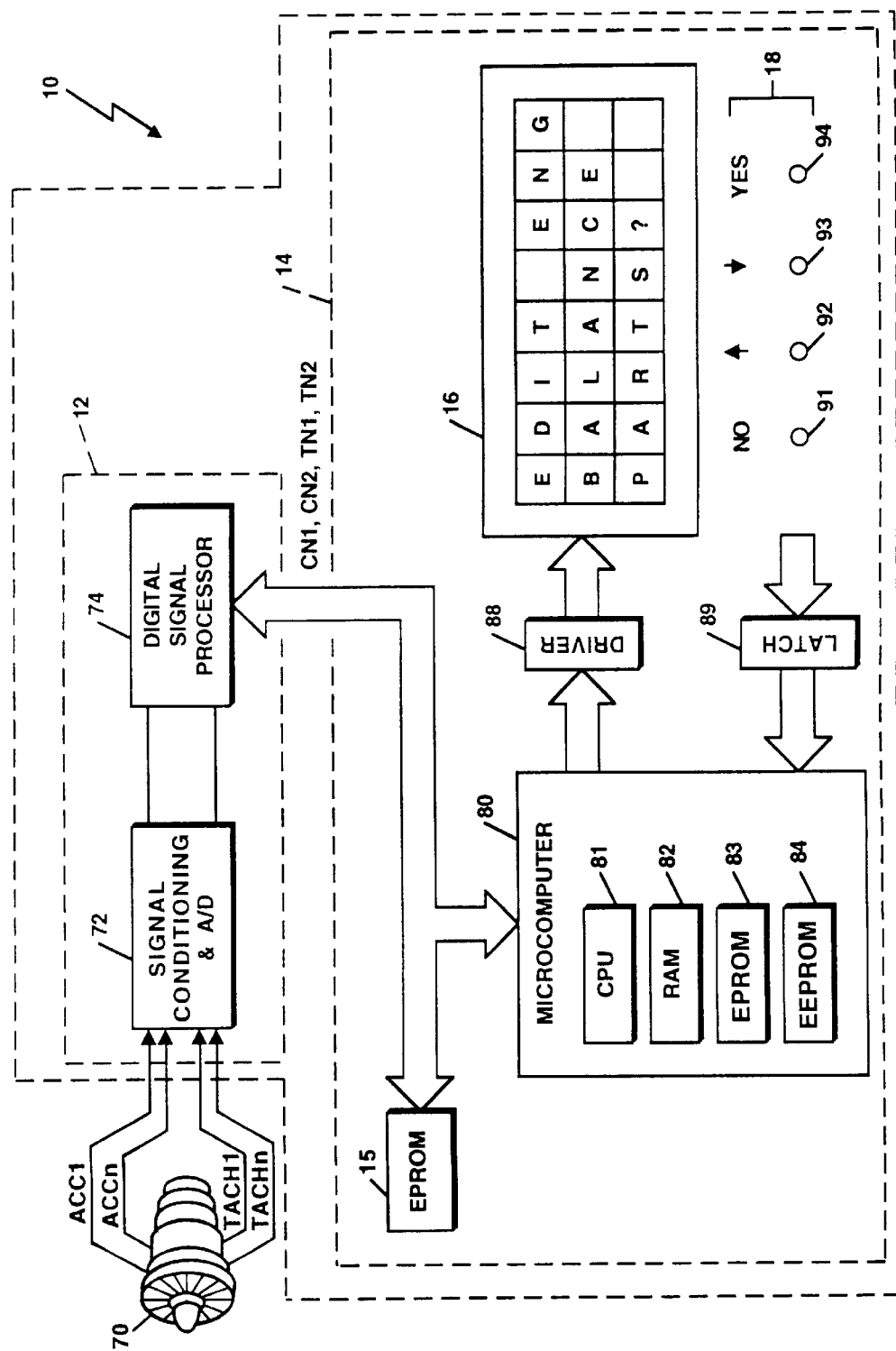
FIG. 3 is a block diagram of the primary components of the system.

FIG. 3 is an electrical block diagram of the components of the engine vibration monitoring system 10. The system 10 comprises the aforementioned signal processor 12 which includes a signal conditioning and analog to digital conversion unit 72 and a digital signal processor 74. The personality module 14 includes the EPROMs 15, a microcomputer 80, a display driver 88, data latch 89, the display 16, and push button activators 18.

In operation, one or more aircraft engines 70 provide a number of signals to the signal conditioning and analog to digital conversion function 72. In particular, the rotational speed of the compressor and turbine fans in each engine is sensed by a tachometer which produces the signals TACH1, ..., TACHn. These signals typically take a form of a stream of pulses wherein the pulse rate is proportional to the rotational speed of the engine. The vibration level of each compressor and turbine is also sensed by piezoelectric accelerometers that provide a set of accelerometer signals ACC1, ..., ACCn.

The digital signal processor 74 in turn performs a number of measurements of the components of these signals, and provides them in digital form to the personality module 14 in a manner which is known. For example, a first signal component CN1 may represent a compressor vibration signal component measured at a speed monitored by a particular tachometer, N1. Another signal component TN1 may represent a turbine vibration signal component also measured by an engine speed indicated by the tachometer N1. In this manner, a number of signal components may be determined for both the compressor and the turbines in each engine measured at a number of speeds.

The digital signal processor 74 may accomplish this narrow band filtering operation in a known manner such as by a high speed digital filter. The signal components are in turn provided for further processing, in the form of digital data, by the microcomputer 80.

The microcomputer 80 includes a central processing unit (CPU) 81, a random access memory (RAM) 82, an electrically programmable read-only memory (EPROM) 83, and an electrically erasable programmable read-only memory (EEPROM) 84. The history of the various measured vibration signal components is recorded by the microcomputer 80 such as by storing them in the EEPROM 84. This data is typically stored during an engine run, or "leg" and then used in later engine balance solution processing after the aircraft lands. Data for a leg is created each time the engines are powered up, whether in a ground test or during in-flight operation.

As shown in FIG. 3 the display 16 is preferably implemented as a three line by eight character alphanumeric display. The contents of the display 16 are controlled via the microcomputer 80 through display driver circuits 88. The display 16 serves to output various messages to the user of the engine vibration monitoring system 10 during engine trim balance procedures.

The user provides input to the system 10 through the interface 18, which in the preferred embodiment is a set of four push button activators. The push buttons include a "NO" push button 91, an "UP" push button 92, a "DOWN" push button 93, and a "YES" push button 94.

The present invention lies in the manner in which a sequence of interactions occur between the user and the system via the display 16 and push buttons 18. The principal purpose of this activity is to calculate an engine trim balance solution and to instruct the user as to how to proceed with balancing the aircraft engines by installing or removing weights from specific fan blade locations. However, a number of auxiliary functions are provided for as well.

Figure 4:
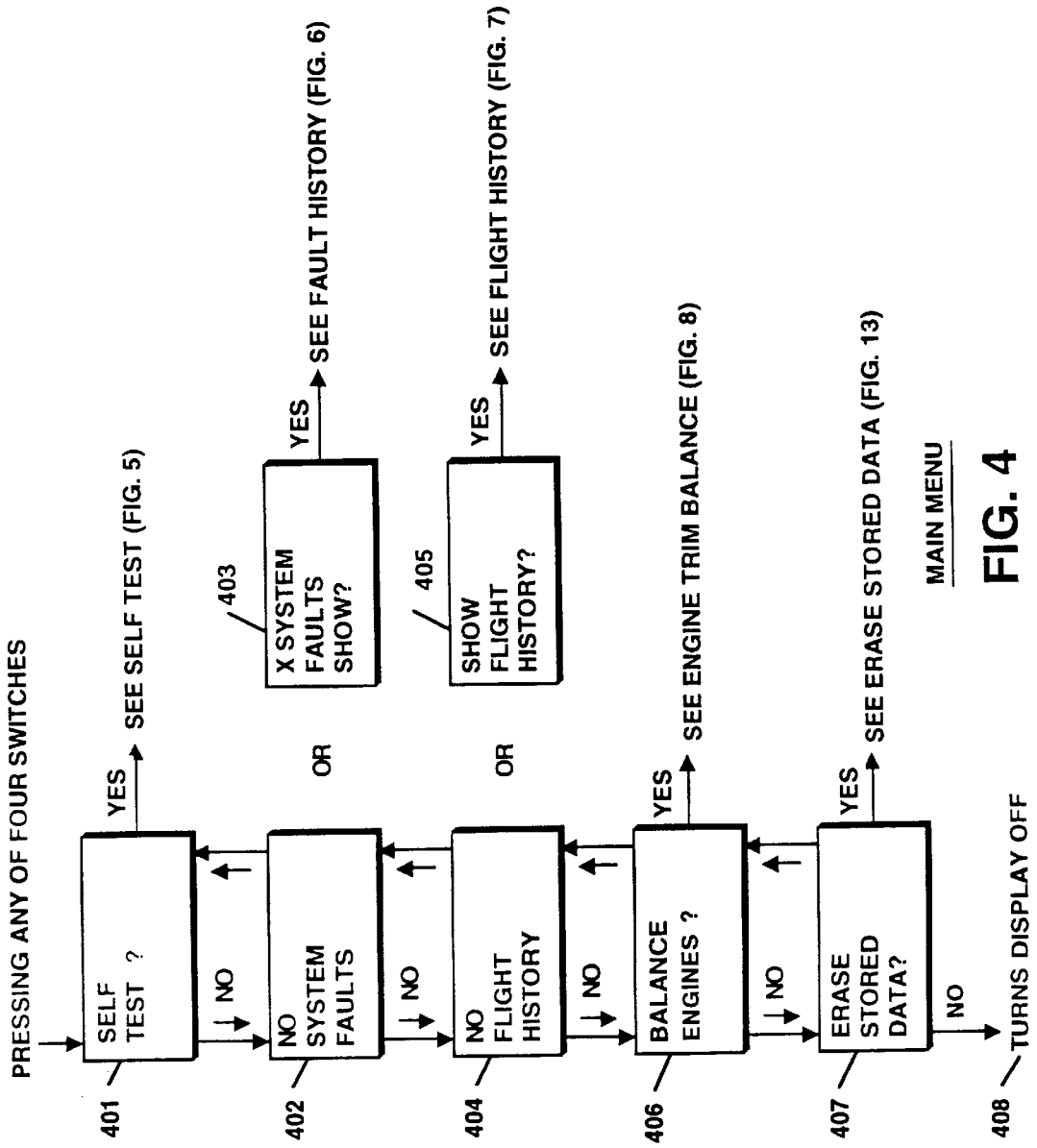
FIG. 4 is a state diagram of the operation of the present invention for a main menu mode.

FIG. 4 is a diagram of a main mode menu sequence of the system 10. Each rectangular block in FIGS. 4 through 13 illustrates the appearance of the display 16 when the system enters a corresponding state. The various arrows indicate the manner in which the user traverses the states to operate the system 10. Thus for example, an arrow having an annotation "NO" pointing to it indicates that the state is entered into by the user pressing the NO button 91 on the front panel 50. Likewise, an UP arrow indicates that the state is traversed by the user pressing the UP button 92, and so forth. Also it is in general true that in most modes the system 10 can be cycled through the various states by the user repeatedly pressing the UP button 92 or the DOWN button 93.

Now continuing with a discussion of the main menu mode, from an initial state in which the system 10 is idle, the user may press any of the four switches to cause the display to enter a state 401. In this state 401 the computer 80 causes the display 16 to show "SELF TEST?" If the user then presses the YES button, then a self test mode is entered, which is described in greater detail in connection with FIG. 5.

Assuming no system faults have been observed however, when the user presses the NO button 91 the system 10 enters a state 402 where the display shows "NO SYSTEM FAULTS". If system faults have been observed, a state 403 is entered instead, in which the message "X SYSTEM FAULTS SHOW?" requests the user to indicate whether a further display of fault information is desired. The digit "X" in this state 403 is actually replaced by one or two digits indicating the number of faults observed.

Figure 7:
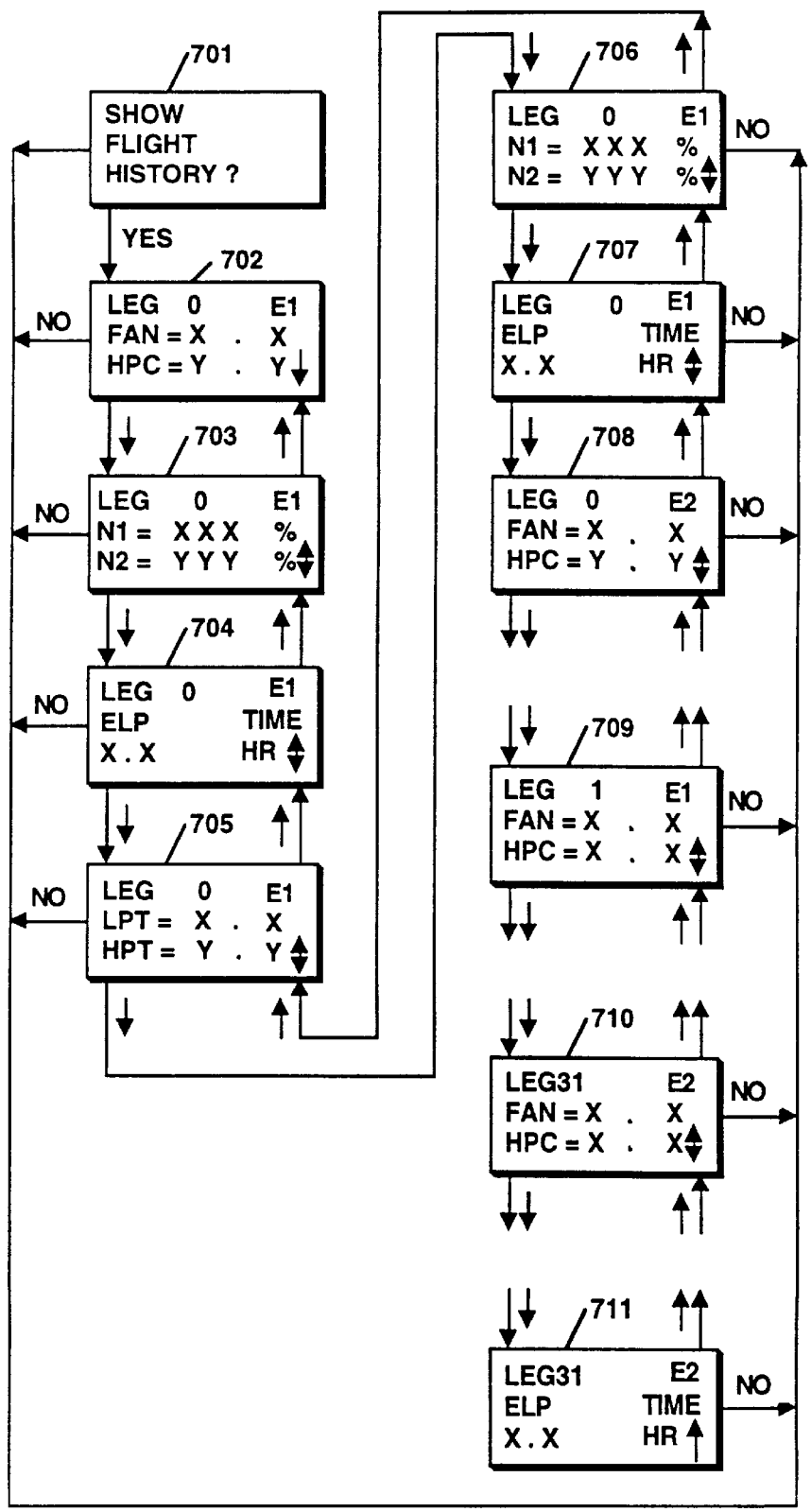
FIG. 7 is a state diagram for a flight history mode.

Having entered state 402, and there being no system faults, the system 10 then waits for the user to press another button. The subsequent activation of the NO button 91 causes the system to enter a state 404 or state 405, depending upon whether there is a recorded flight history. If there is no flight history then a state 404 is entered, in which the display 16 confirms this fact. Otherwise, if there has been a flight history recorded, then state 405 is entered. In state 405 the display 16 prompts user for further information by displaying the message "SHOW FLIGHT HISTORY?". If the user subsequently presses YES 94, then the system performs the flight history procedure as shown in FIG. 7.

Figure 8:
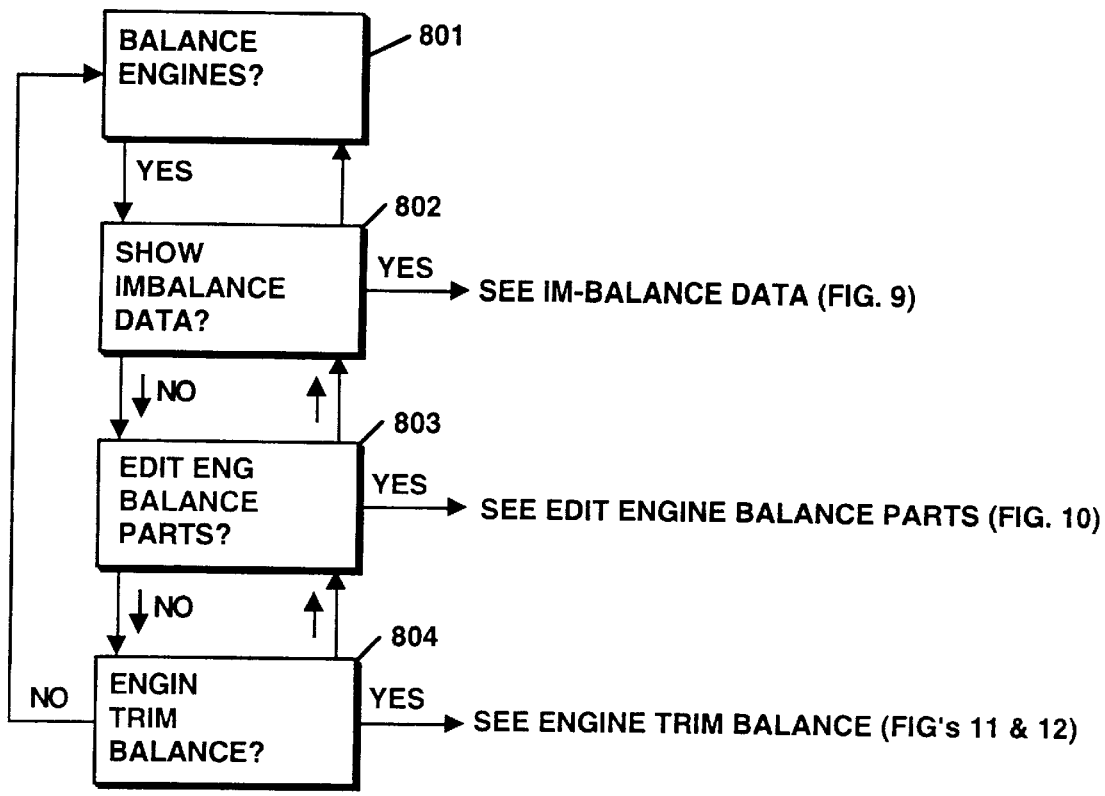
FIG. 8 is a state diagram for an engine trim balance mode.

Otherwise, if there is no recorded flight history and the user presses NO 91, then the system enters state 406 with the display now showing "BALANCE ENGINES?" At this point, if the user wishes to perform a procedure to balance the engines, this is indicated by pressing the YES button, and the engine trim balance procedure is then performed as in FIG. 8.

Figure 13:
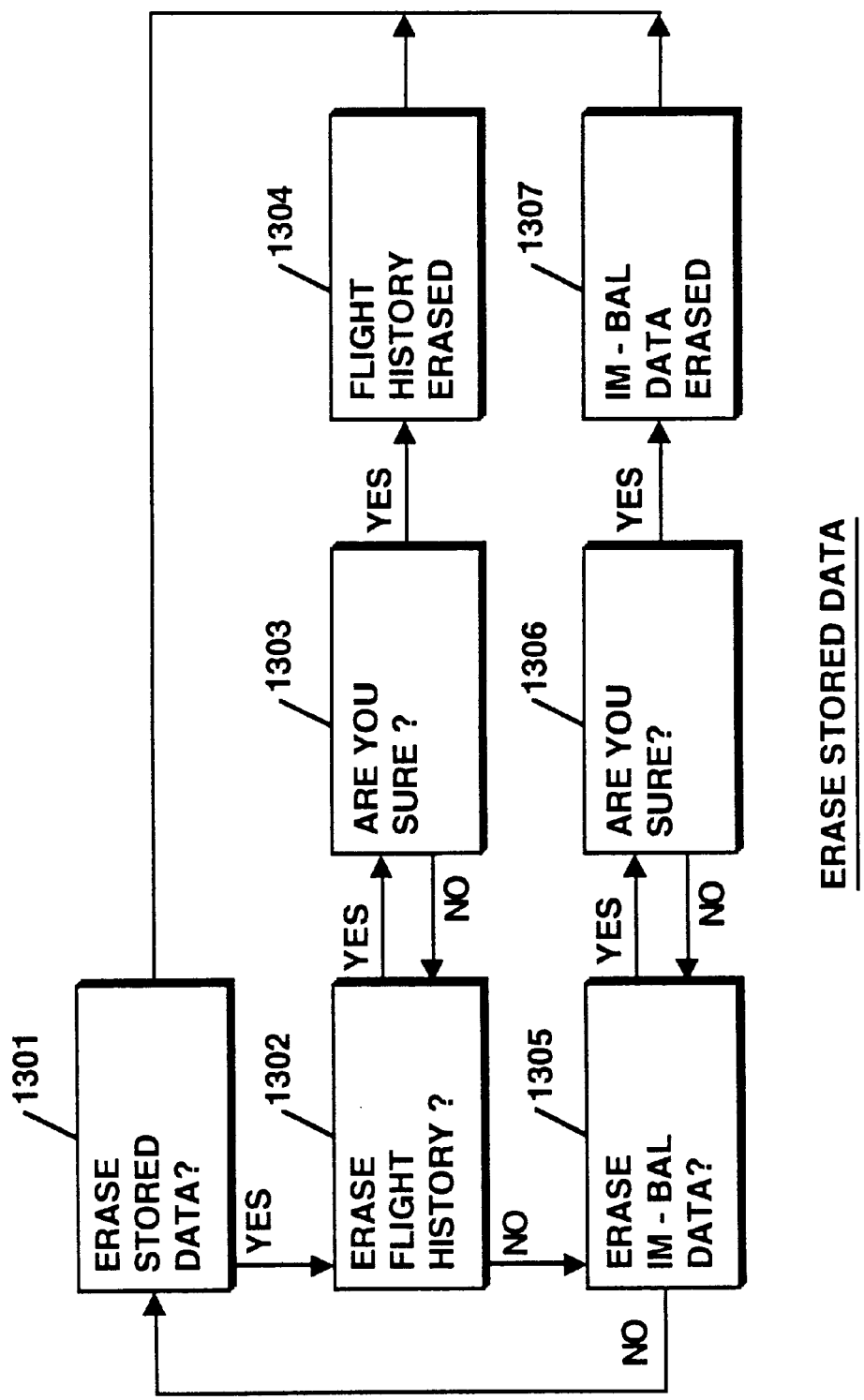
FIG. 13 is a state diagram for an erase stored data mode.

In state 406, if the user presses NO 91, a state 407 is entered. Here the display prompts the user with the question "ERASE STORED DATA?". If the user wishes to erase data stored in the system, then the procedure for so doing as shown in FIG. 13 is performed. Otherwise, pressing the NO button causes the system 10 to enter a state 408 where the display 16 is turned off.

Figure 5:
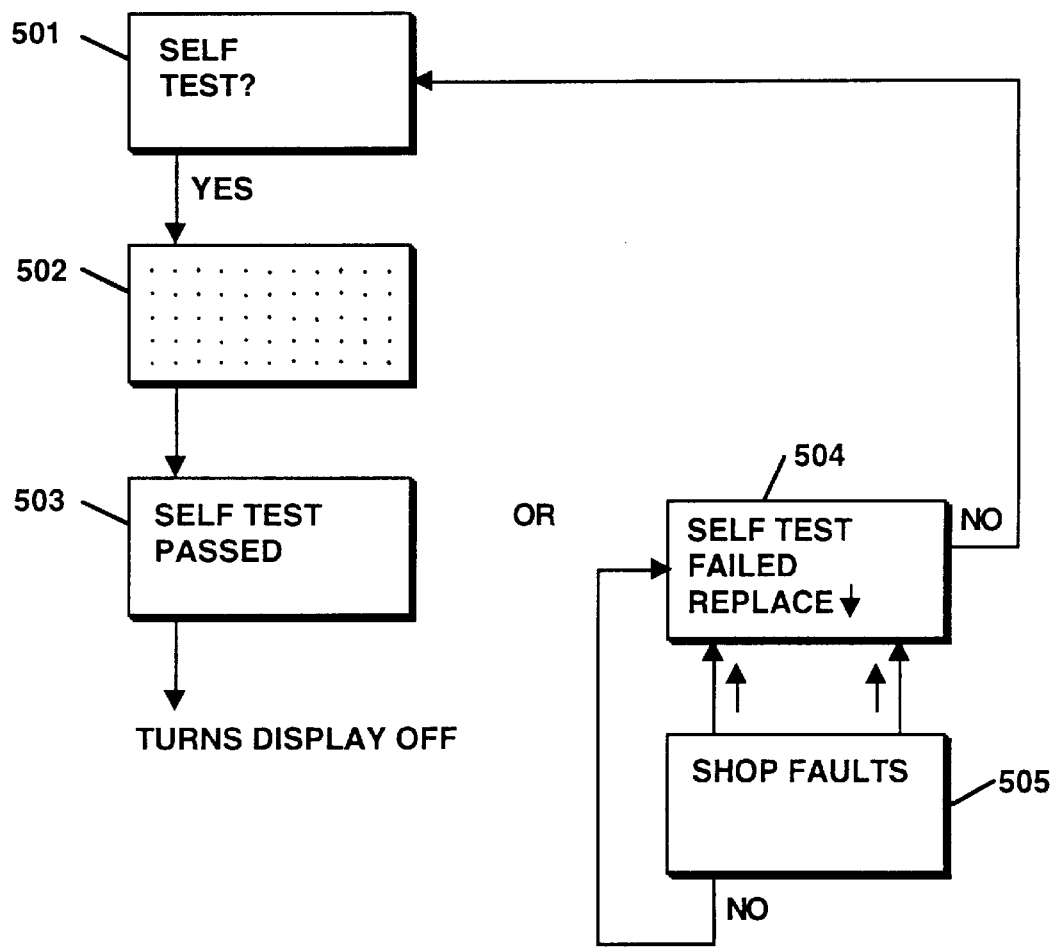
FIG. 5 is a state diagram for a self-test mode.

FIG. 5 is an illustration of the states that comprise the self test mode. In a first state 501, the display shows the prompt "SELF TEST?". Subsequent pressing of the YES button 94 causes the system 10 to enter a state 502 where various system tests are performed. The display in this mode may illuminate as dots in all positions while the tests are performed. Upon completion of the tests the system will either enter a state 503 or a state 504, displaying either "SELF TEST PASSES" or "SELF TEST FAILED".

In the former case of a successful test, the display informs the user of this by entering state 503, then after a period of time, the display turns off. If, however, there are faults, the system 10 enters a state 504 where the user may cycle through a list of the faults by pressing UP 92 or DOWN 93. Possible faults may include memory faults, or faults in the low speed tachometer, high speed tachometer filter, low speed tracking filter, or high speed tracking filter.

Figure 6:
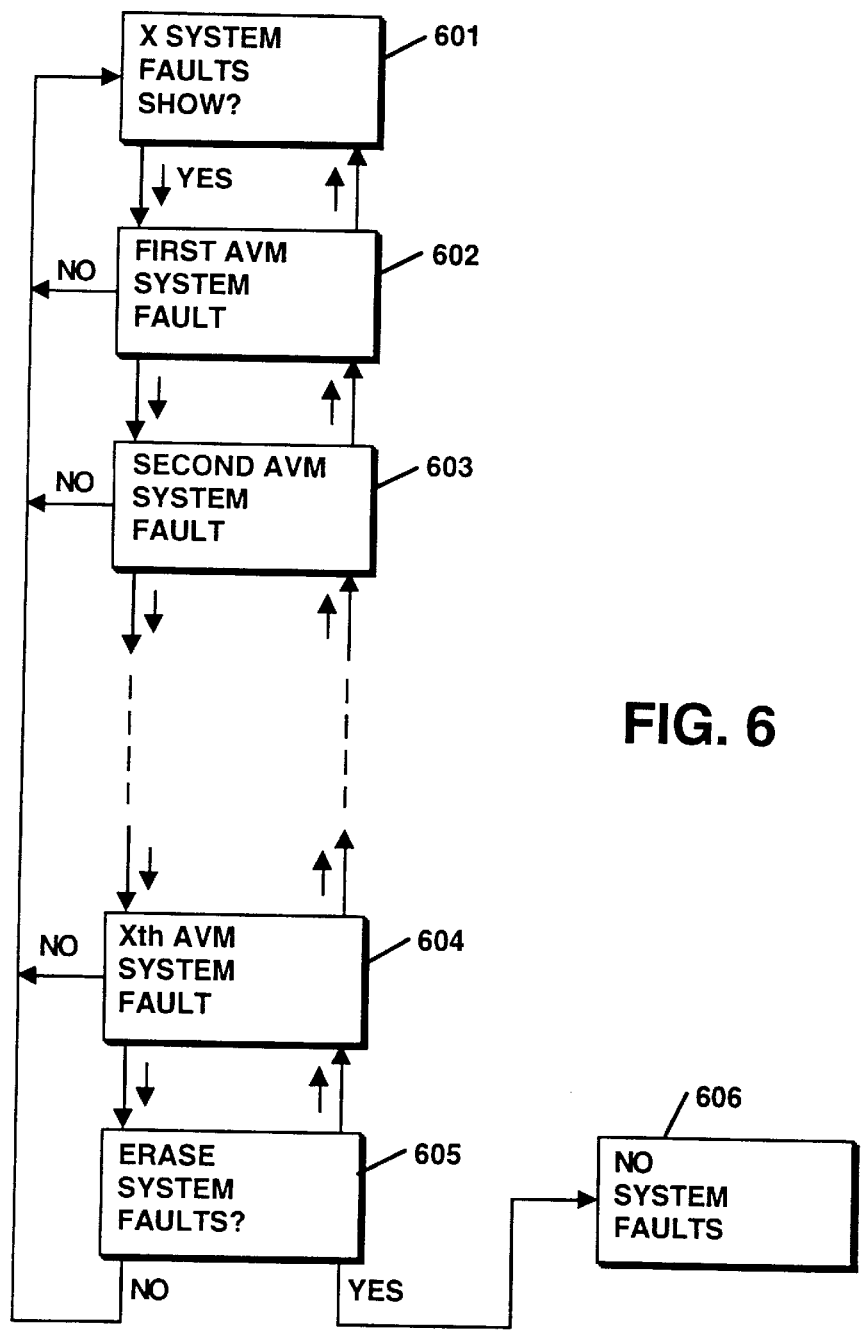
FIG. 6 is a state diagram for a fault history mode.

FIG. 6 is a state diagram for the fault history process. In a first state 601, the display illustrates "X SYSTEM FAULTS SHOW?", where X indicates a number of system faults. The process then proceeds through a number of states depending upon the number of faults. For example, if there are five total faults then the illustrated states 602, 603, and 604 will actually be five different states. The various faults may be examined by the user stepping forward through them by pressing the DOWN button 92 and UP buttons 93 as illustrated. The table below the state diagram indicates the possible system faults, such as may include tachometer sense, cable, or balance function faults.

After a final state 604, the system may prompt the user with the question "ERASE SYSTEM FAULTS?", as in state 605. If no erasing is desired, the system returns to state 601. Otherwise, the system enters a state 606 in which "NO SYSTEM FAULTS" is displayed after the fault data memory locations are erased.

FIG. 7 illustrates a flight history mode. In this mode the system 10 may be used to display the highest tracked vibrations observed during a flight for both accelerometers for each of the two engines. In an initial state 701 the system displays "SHOW FLIGHT HISTORY?" to determine whether the user wishes to examine flight history data. If so, the user then presses YES 94 and the system 10 enters state 702. In state 702 the display indicates a leg number index, an engine number, fan data and compressor data. In particular, the display shows

LEG 0 E1
FAN=X.X
HPC=Y.Y where the number "0" next to the label "LEG" indicates the index of the flight leg. The indicia "E1" indicates that data is displayed for engine number one. The number "X.X", where X.X is replaced by a numeric reading, corresponds to the highest vibration measured by the turbine fan bearing sensor. A highest vibration measured by the compressor bearing sensor is indicated as "Y.Y" as well.

An arrow character may be illuminated in the lower right hand corner of the display 16 to indicate to the user that the flight history records can be reviewed by pressing the UP 92 or DOWN 93 buttons. Pushing the DOWN button 93 at this point causes additional data for the compressor to be shown for leg 0, engine 1 as:

LEG 0 E1
N1=XXX%
N2=YYY% where XXX and YYY are a percent of the full engine speed at which the low pressure shaft tachometer (N1) and turbine high pressure shaft tachometer (N2), respectively, measured the high vibration data for the fan.

Pushing the DOWN button 93 once again causes the system to enter a state 704 where additional flight data for leg 0, engine 1 is shown. In this state 704 the display illustrates compressor data as:

LEG 0 E1
ELP TIME
X.X HR where X.X is the elapsed time from engine start until the highest vibration data for the compressor fan was recorded.

By then pressing the DOWN button 93, a state 705 is entered where the turbine data may be examined for the leg 0 engine 1 run. In this state, the display shows:

LEG 0 E1
LPT=X.X
HPT=Y.Y where X.X is the highest vibration measured by the low pressure shaft tachometer (N1) sensor, and Y.Y is the highest vibration data measured by the high pressure shaft tachometer (N2) sensor.

From state 705 the next state 706 is entered when the user next presses DOWN 93. In this state 706, the percent of maximum engine speed at which highest vibration for the turbine was observed is displayed. In particular, the display shows:

LEG 0 E1
N1=XXX%
N2=YYY% where XXX represents the N1 reading and YYY represents the N2 reading at which the high vibration data was recorded.

By pressing the DOWN button 93 a next state 707 is entered where an elapsed time "X.X" is displayed that indicates the time from engine start until the point at which the turbine high vibration data was recorded.

Upon pushing the DOWN button from state 707 the user may then review the data recorded for leg 0, engine number 2. The display sequence starts with the compressor fan sensor data and continues with the turbine data as for engine 1.

After completing the display of data for engine 2, a state 709 is entered where data for previous legs, such as a leg 1 up through and including a leg 31, may be displayed in the same manner.

By using the UP 92 and DOWN 93 buttons to cycle the display 16 through states 702 through 707 the user may thus review a complete record of the data for leg 0, engine number 1.

Turning attention now to FIG. 8, the engine trim balance mode will be described in greater detail. In a state 801 the display illustrates the prompt "BALANCE ENGINES?". The system then enters a state 802 in response to the user pressing YES 94. In this state 802, the display asks the user if they wish to "SHOW IMBALANCE DATA?". If the user presses YES, then the system performs the imbalance data process in FIG. 9.

Figure 10:
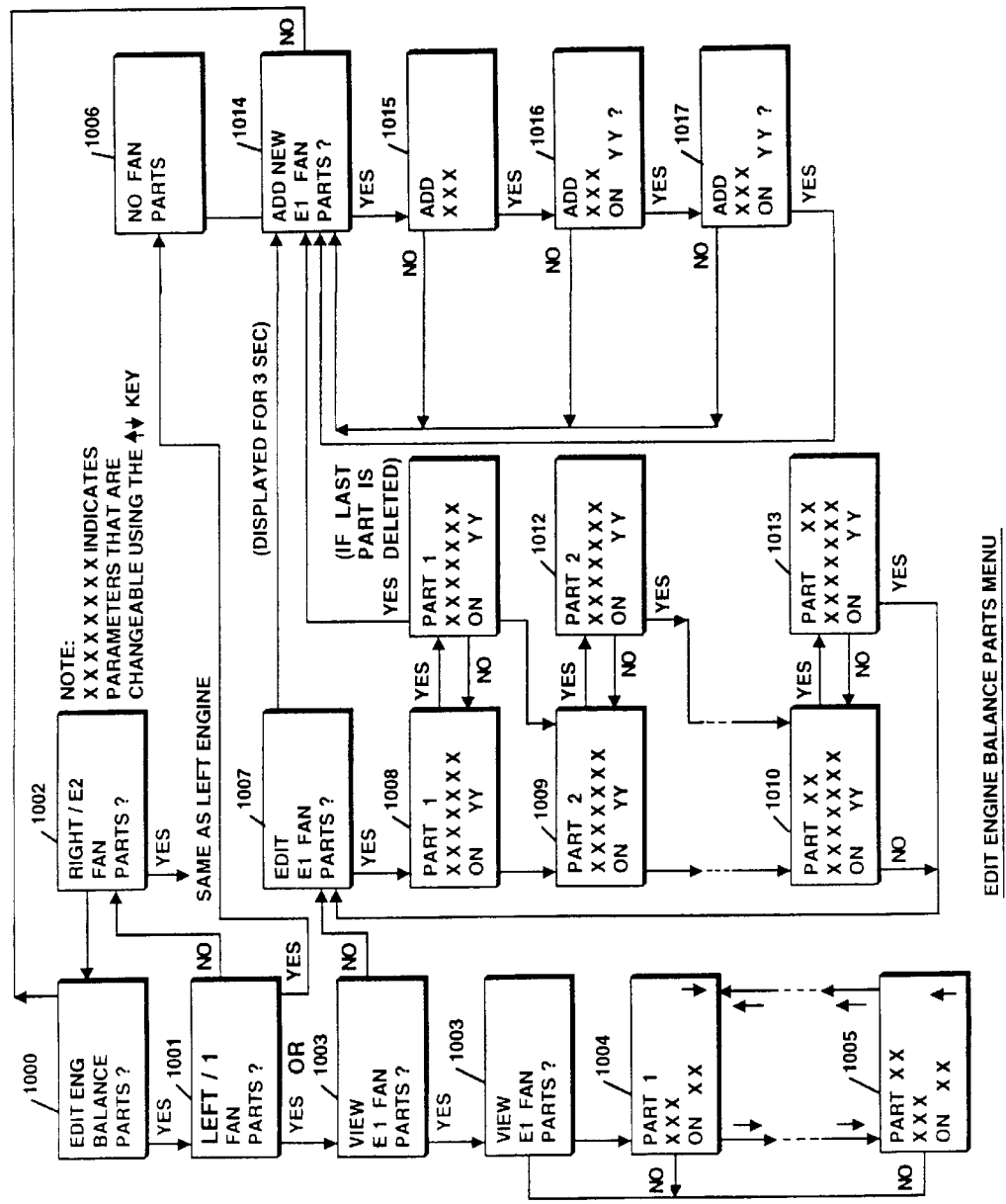
FIG. 10 is a state diagram for an edit engine balance part mode.

If, however, the user presses NO 91, then the system enters a state 803 where the display illustrates "EDIT ENG BALANCE PARTS?". If the user presses the YES button, then the system 10 enters a state where the edit engine balance parts process shown in FIG. 10 is performed.

Figure 11:
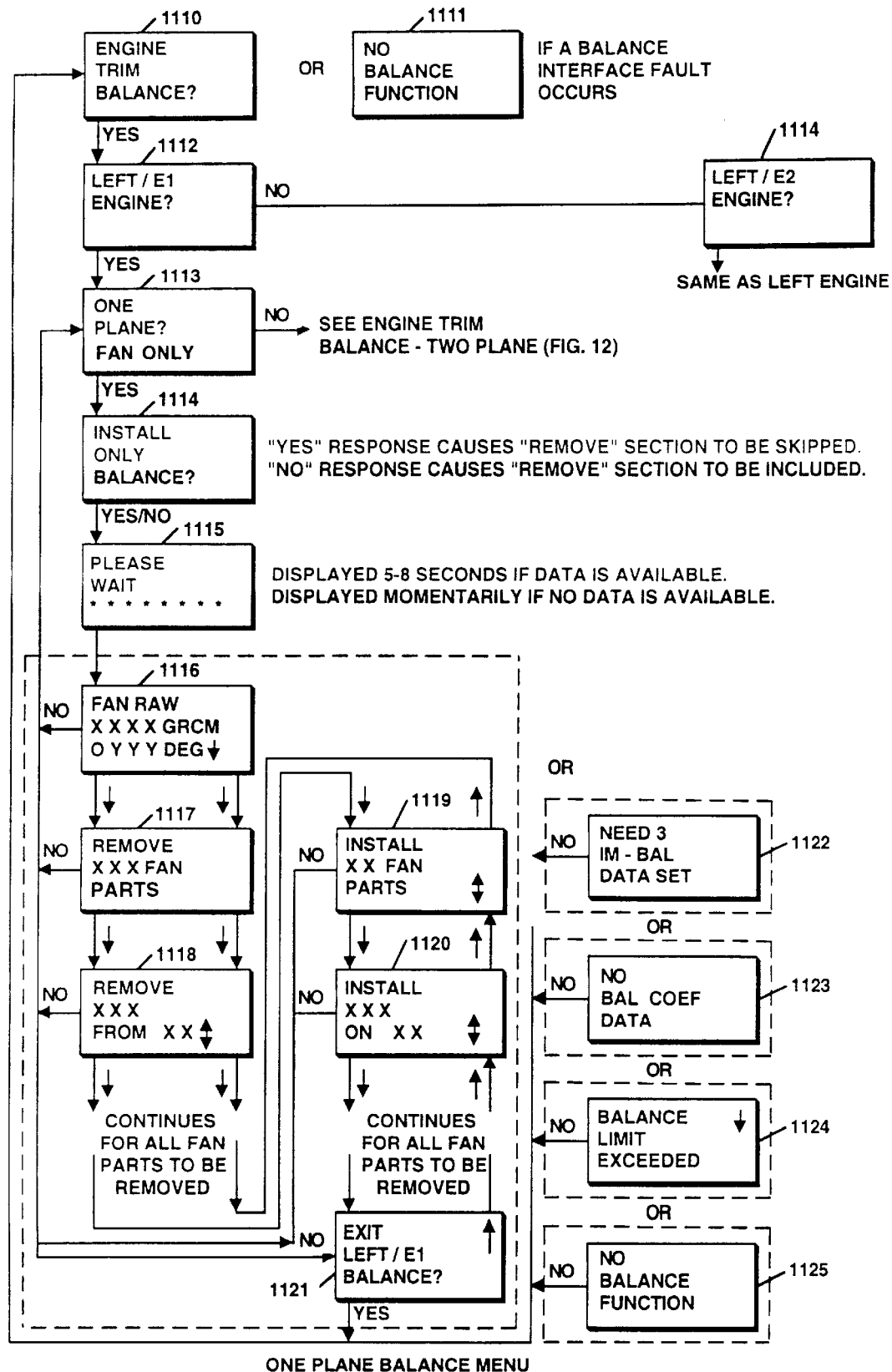
FIG. 11 is a state diagram for a one plane balance mode.
Figure 12:
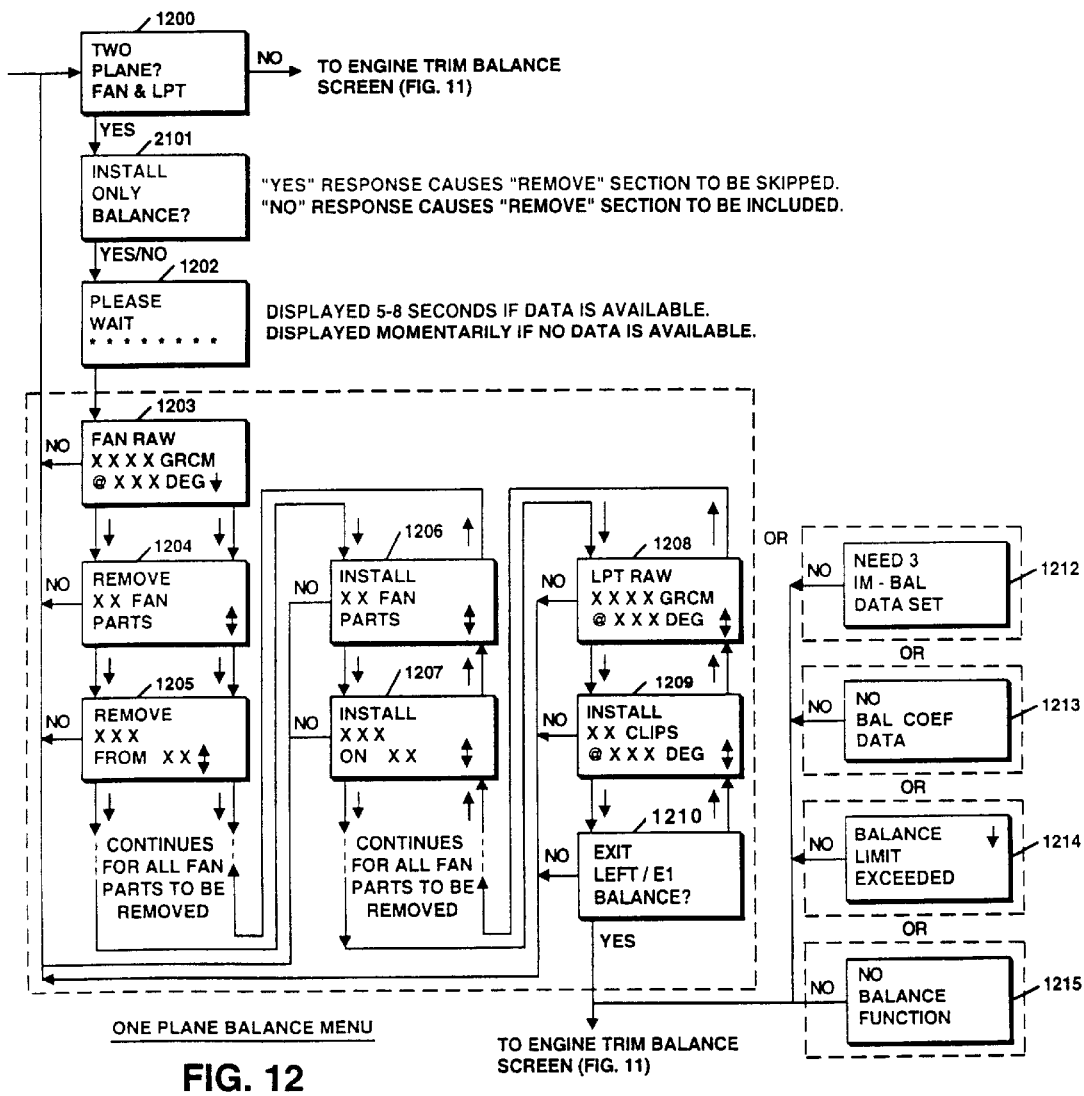
FIG. 12 is a state diagram for a two plane balance mode.

Returning to state 803, if the user presses the NO button, then the system enters a state 804 where the display illustrates "ENGINE TRIM BALANCE?". In this state 804, if the user presses YES 94, then the system 10 proceeds to perform an engine trim balance process as shown in FIGS. 11 and 12. While in state 804, if the user presses the NO button, then the system reenters state 801.

Figure 9:
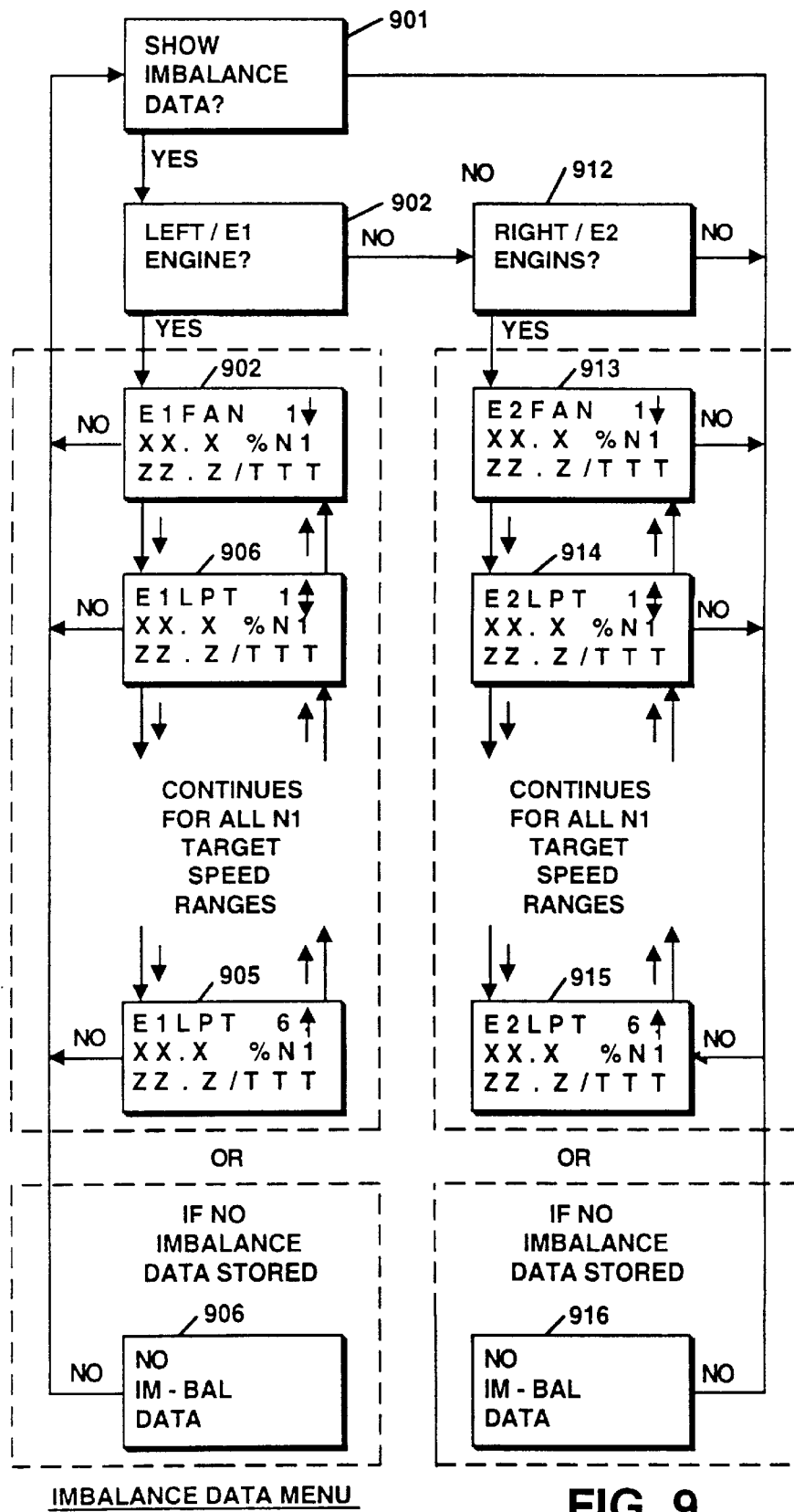
FIG. 9 is a state diagram for an imbalance data mode.

The imbalance data process is shown in FIG. 9. Imbalance data is engine fan and turbine vibration data that is recorded automatically during a leg, for a predetermined number of target speed ranges. Target speed ranges may be identified by an index number, with each target speed range index covering a predetermined percent range of full engine speed. For example, speed ranges may be defined as follows:

| RANGE INDEX | TARGET SPEED RANGE |
| --- | --- |
| 1 | 69.0 to 75.9% |
| 2 | 76.0 to 81.9% |
| 3 | 82.0 to 86.9% |
| 4 | 87.0 to 91.9% |

-continued

| RANGE INDEX | TARGET SPEED RANGE |
|---|---|
| 5 | 92.0 to 95.9% |
| 6 | 96.0 to 99.9% |

For each target speed range the microprocessor 80 records the greatest and most stable imbalance data for the last leg. The data is recorded for both the fan and turbine sensors. Each recorded data set includes the actual engine speed at which imbalance data was taken, the imbalance vibration amplitude, and imbalance vibration phase. Being stored only for the last leg, the imbalance data is written over with new imbalance data each time the engines are restarted again.

The imbalance data display process, shown in FIG. 9, starts at a state 901 in which the display prompts the user with the message "SHOW IMBALANCE DATA?". Upon the user pressing the YES button 94, a state 902 is entered where the display asks "LEFT/E1 ENGINE?". If the user presses YES 94 again, then the system enters a state 903 whereby imbalance data for the left engine is shown. Data for each of the six target ranges is then displayed in successive states 903, 904, . . . , 905.

If, however, in state 902 the user presses NO 91, then the display will show "RIGHT/E2 ENGINE?" upon entering a state 912. From state 912, if the user presses the YES button, then states 913, 914, and 915 are successively entered into whereby the fan (FAN) and low pressure turbine (LPT) data for each of the six target speed ranges may be examined. At any point during the processing of states 903 through 905 or states 913 through 915, if the user presses NO 91, they are taken back to the state 901 where the display again illustrates "SHOW IMBALANCE DATA?".

If no imbalance data is available from either step 902 or step 912, then a state 906 or 916 is entered, respectively, in which the display shows "NO IMBAL DATA" indicating that no imbalance data is available for the particular engine.

In states 903, 904, . . . , 905, and 913, 914, . . . , 915 imbalance data for a selected engine and range is shown on the display as

| E1 FAN R | | E1 LPT R |
|---|---|---|
| YY.Y %N1 | or | YY.Y %N1 |
| ZZ.Z/TTT | | ZZ.Z/TTT | where in the first line, E1 is the engine number indication, FAN indicates the display is showing compressor fan data, LPT indicates that the display is showing low pressure turbine data, and the number R indicates the imbalance range number. In the second and third lines, YY.Y is the engine speed for which the imbalance data was recorded, ZZ.Z is the magnitude of the imbalance data in mils, and TTT is the phase of the imbalance data in degrees.

Note again that the user may scroll through the imbalance data display by using the UP 92 and DOWN 93 buttons as desired. At any point during the imbalance data menu the user may exit this mode by pressing NO 91.

FIG. 10 shows the edit engine balance parts procedure. The procedure has several functions, allowing the user to compare the physical installation of balance parts to stored the data pertaining thereto as presently recorded in the system 10. From an initial state 1000, the user is prompted with the message "EDIT ENG BALANCE PARTS?". If the user presses YES 94, then "LEFT/E1 FAN PARTS" is displayed in state 1001. If the user presses NO 91, then state 1002 is entered where the system asks "RIGHT/E2 FAN PARTS?". If the user presses NO 91, then the system returns to state 1000. If, the user presses YES 94, however, then state 1003 is entered. State 1006 is entered if no fan parts have been indicated to the system as being installed on the fan blades.

Assuming the system 10 has been instructed in state 1001 that parts are installed on the fan blades, then in state 1003 the display shows "VIEW E1/FAN PARTS?". If the user wishes to view the list of fan balance parts that the system presently has recorded as being installed on the fan blades of engine number 1 (E1), then the system proceeds to states 1004 through 1005, where the user is permitted to examine stored data pertaining to each of the parts and their location. Although only two states 1004 and 1005 are shown in the drawings, it should be understood that as many states as are necessary to review each of the E1 fan parts which have been actually stored. At any point during the states 1004 through 1005 the user may return to state 1003 by pressing NO 91.

Once in state 1003, if the user presses NO 91, then the system proceeds to a state 1007 where the user is prompted with the message "EDIT E1 FAN PARTS?", to determine whether or not they wish to edit the fan part list as presently stored in the system 10. If they do wish to do so, this is indicated by pressing NO 91 and state 1014 is entered.

If the user does wish to edit the list of fan parts as stored in the system 10, then states 1008 through 1010 may be successively entered into by pressing YES 94. There is a state 1008 through 1010 for each fan part. In state 1008 the display illustrates "PART 1 XXX ON YY" where XXX indicates a part identification parameter that may be changed by the user pressing the UP 92 or DOWN 93 button, and "YY" indicates a part location such as a fan blade number. In response to this prompt, the user may thus indicate which parts are installed on a particular fan blade, and/or remove parts from the list of installed parts.

From state 1014, if no new fan parts are to be installed then the process returns to state 1000. If, however, in state 1014 there are new fan parts to be installed, this may be indicated by the user pressing the YES button. The system 10 then enters a state 1015 where the display indicates "ADD XXX". If the user responds by pressing NO 91, then the system returns to a state 1014. If the user presses YES 94 here, then the system enters states 1016 through 1017 where the user may indicate which particular fan parts are to be added.

In this manner the user may ensure that data stored in the microcomputer 80 tracks the physical reality of where particular parts are installed on particular fan blades.

Turning attention now to FIG. 11, the engine trim balance process will be described. In an initial state 1110 the display prompts the user with the message "ENGINE TRIM BALANCE?". This state is entered only if no balance interface faults have occurred. If balance interface faults have occurred, the system enters a state 1111 where the display indicates that "NO BALANCE FUNCTION" is presently available.

If, however, the balance interface is operating properly and the user presses YES 94 in state 1111, then state 1112 is entered where the display asks "LEFT/E1 ENGINE?". If the user wishes to run the balance plane solution for the left engine, this is indicated by pressing YES 94, and a state 1113 is entered. If, however, the user does not wish to perform balancing of the left engine, then a state 1114 is entered where the display prompts with "RIGHT/E2 ENGINE?".

The engine balancing process is the same for either engine, and thus only the procedure for the one of the engines will be herein described in detail, it being understood that the procedure is similar for the other.

In a state 1113, the user is asked "ONE PLANE FAN ONLY?". If the user indicates NO 91 in response, then a two-plane engine trim balance process is performed as shown in FIG. 12. However, if the user wishes to perform a single plane "fan only" solution, as indicated by pressing YES 94, then the system enters state 1114 in FIG. 11.

In state 1114 the user is asked if they would like to perform an "INSTALL ONLY BALANCE" procedure. If so, the remove procedure in states 1117 and 1118 is skipped below. The install only process is typically selected if no balance parts are installed on the fan blades.

From state 1114, the system enters a state 1115 where the display shows "PLEASE WAIT" for a period of time, while the system computes a one plane balance solution. The imbalance data from the last flight leg or engine ground run is used in this procedure to compute a one shot balance solution, using generic balance coefficients. The one plane balance solution is displayed in state 1116 in terms of a raw solution that indicates the amount of weight correction in grams per centimeter and location correction in degrees.

A display for the one-plane balance solution as shown in state 1116 indicates these as

FAN RAW

XXX GRCM

YYY DEG where XXXX is the raw solution in grams per centimeter and YYY is a location on the fan in degrees.

The user may then review a specific balance part and location solution by pressing the DOWN button 93. The specific solution is presented to the user as a list of parts to be removed and a list of parts to be added to the fan blades.

First, in a set of states 1117 through 1118, the user will be prompted by the display showing "REMOVE XX FAN PARTS" to instruct the user to remove particular fan parts. A state 1117 through 1118 will be entered into for each fan part to be removed.

From state 1118, a state 1119 is entered wherein the user is prompted to decide whether they wish to install particular parts at particular fan locations. If so, states 1119 and 1120 are entered into to indicate both the part number of a fan part to be installed as well as a fan blade hole number in which the part is to be installed. The states 1119 and 1120 are repeated for each of the fan parts to be installed.

In a final state 1121, the display shows "EXIT LEFT/E1 BALANCE?", in which the user may exit the balance procedure for engine E1 by pressing the YES button. If the user presses NO, then the process returns to state 1113. If, however, the user presses YES, then the process returns to state 1110.

At various points in the process of states 1116 through 1121, various states 1122 through 1125 may be entered into if the imbalance data set is incomplete; no balance coefficient data is available; a balance limit is exceeded; or no balance function is available, as indicated by state diagram rectangles 1122, 1123, 1124, and 1125 respectively.

The two plane balance solution process is now described in connection with FIG. 12. In a state 1200 the display asks "TWO PLANE FAN AND LPT?". If the user presses YES 94, then state 1201 in a two plane balance process using both fan and turbine data is entered. However, if the user presses NO 91, then the system is returned to the engine trim balance state 1110 in FIG. 11.

In state 1201, the user is prompted with the question "INSTALL ONLY BALANCE?". If the user presses YES, then the remove fan parts process of states 1204 through 1205 below is skipped. If, however, the user presses NO, then the remove fan parts states 1204 through 1205 are included.

In any event, once the user presses the YES or NO button then the procedure moves forward to a state 1202 where the display illustrates "PLEASE WAIT", for a period of time required for the balance solution to be calculated. Upon completion of the calculation the system enters state 1203 in which the raw solution for the fan is illustrated. If at this point the user presses NO 91, then the procedure returns to state 1200. If, however, the user presses the UP 92 or the DOWN 93 button, and presuming that a NO 91 was entered in state 1201, then the user is prompted to remove particular fan parts in states 1204 through 1205 for each of the fan parts to be removed.

The illustration of the balance solution processing from state 1203 is similar to that previously described in connection with state 1116 for the single plane "fan only" solution. From state 1205 the user is then prompted to install fan parts as required by the balance solution in states 1206 and 1207. Once each of the fan parts to be installed have been prompted for, then the process proceeds to a state 1208 where the display 16 illustrates the raw solution for the low pressure turbine. The display shows, as in state 1203, a raw weight solution in grams per centimeter and degree angle.

Upon the user pressing DOWN 93, the system enters a state 1209 where the display prompts the user with "INSTALL XX CLIPS AT YYY DEG", where XX indicates the number of clips to be installed, and YYY indicates the location on the low pressure turbine at which the clips should be installed.

In any event, once the installation of each of the required clips is confirmed, then a state 1210 is entered wherein the display illustrates "EXIT LEFT/E1 BALANCE". If the user wishes to exit at this point, then the process proceeds to the engine trim balance screen at state 1110. If, however, the user does not wish to exit, then processing returns to state 1200.

At any point during the execution of the states in FIG. 12, messages may be generated by the existence or absence of particular data. These are illustrated as an indication of needing imbalance data set in state 1212, no balance coefficient data available in state 1213, balance limited exceeded in state 1214, or no balance function being available in state 1215.

FIG. 13 shows an erase stored data process. In a first state 1301 the display asks "ERASE STORED DATA?". If the user presses YES 94, then a state 1302 is entered in which the display shows "ERASE FLIGHT HISTORY?". If the user presses YES 94 again, then the system enters a state 1303 displaying "ARE YOU SURE?". If the user presses NO, then the system returns to state 1302. If, however, the user presses YES 94, then state 1304 is entered in which the display illustrates "FLIGHT HISTORY ERASED". At this point the microcomputer 80 erases the stored flight history and returns to state 1301.

In state 1302 if the user does not wish to erase the flight history, as indicated by pressing NO 91 in state 1305, the display shows "ERASE INB?BAL DATA?". If the user wishes to erase the imbalance data, such as indicated by pressing YES 94, then a state 1306 is entered. From this state 1306, in which the display illustrates "ARE YOU SURE?", if the user presses the YES button again, then a state 1307 is entered in which the display confirms with the message "IN?BAL DATA ERASED". The microcomputer 80 then erases the stored imbalance data. From this state 1307, processing returns to state 1301.

While we have shown and described several embodiments in accordance with the present invention, it is to be understood that the invention is not limited thereto, but is susceptible to numerous changes and modifications as known to persons skilled in the art. We therefore do not wish to be limited to details shown and described herein, but intend to cover all such changes and modifications as are obvious to one of ordinary skill in the art.

What is claimed is:

1. In an on-board engine trim balance information system comprising a housing and electronic circuit assembly in said housing, said housing having a front face, and said electronic circuit assembly including signal processing means for receiving signals from one or more engines indicative of vibrations generated during operation of said one or more engines and for processing said signals to generate vibration data, the system comprising:

an integral alphanumeric display, disposed on the front face of the housing and integrally formed therewith, the alphanumeric display having multiple lines and multiple characters per line, the display operable to present vibration data and other information;

a computer including a memory and a processing unit, the computer being connected to receive and store the vibration data from the signal processing means, and also being connected to operate the display, the processing unit and memory connected to provide a computer program that implements a plurality of display modes for presenting the vibration data and engine balance information derived by the computer from the vibration data, the computer program providing for switching between the display modes, the computer program also providing a multilevel menu structure for presenting the vibration data and engine balance information; and an integral operator interface including a set of actuators, the actuators disposed integrally with the front face of the housing, and the actuators connected to the computer for permitting a user of the system to perform a sequence of interactions by operating the actuators on the face of the housing to switch the computer program between the display modes, and to also thereby operate the multilevel menu structure to review vibration data and engine balance solution information.

2. A system as in claim 1 wherein one of the modes which may be selected by the user operating the integral interface is a flight history mode in which the display presents flight data for a past engine leg as recorded by the computer.

3. A system as in claim 2 wherein the computer records flight data for multiple legs and the computer provides for display modes in which data for each leg is displayed by sequential selection of the display modes through operation of the actuators.

4. A system as in claim 3 wherein the computer records flight data for multiple engines, and the computer provides for display modes in which data for each engine is displayed by sequential selection of the display modes through operation of the actuators.

5. A system as in claim 2 wherein the computer records a highest vibration for both a compressor and a turbine component of the engine as well as a time of highest vibration for these components, and the computer provides for display modes in which high vibration compressor data, high vibration turbine data, and time of highest vibration data is displayed by sequential selection of the display modes through operation of the actuators.

6. A system as in claim 5 wherein the computer determines a percent of full speed data value for the highest vibration of the compressor and turbine, and the computer provides for display modes in which the percent of full speed data values are displayed by sequential operation of the actuators.

7. A system as in claim 1 wherein one of the modes which may be selected by the user operating the integral interface is an engine balance menu mode in which the display presents a sequence of prompts for selecting other modes, and the prompts include a show imbalance data mode prompt and an engine trim balance mode prompt, and the show imbalance data mode prompt and the engine trim balance mode prompt may be selected by sequential operation of the actuators.

8. A system as in claim 7 in which one of the prompts also includes an edit engine balance parts prompt which may also be selected by sequential operation of the actuators.

9. A system as in claim 1 wherein the computer determines a percent of full speed data value for the highest vibration of the compressor and turbine for multiple predetermined ranges of engine speeds, and the computer provides for a plurality of imbalance menu display modes in which the highest vibration data for the multiple predetermined ranges of engine speeds are displayed by sequential operation of the actuators.

10. A system as in claim 1 wherein one of the modes which may be selected by the user operating the integral interface is an edit engine balance parts menu mode in which the display presents a sequence of prompts for reviewing a list of data stored in the computer which represents particular balance part identification and the location of installation of such balance parts on the engine.

11. A system as in claim 1 wherein one of the modes which may be selected by the user operating the integral interface is an edit engine balance parts menu mode in which the display presents a sequence of prompts for permitting the user to modify a list of data stored in the computer which represents particular balance part identification and the location of installation of such balance parts on the engine.

12. A system as in claim 1 wherein one of the modes which may be selected by the user operating the integral interface is an engine trim balance menu mode in which the display presents a sequence of prompts for permitting the user to review engine trim balance solutions.

13. A system as in claim 12 wherein the sequence of prompts include a one-plane solution mode prompt and a multiple-plane solution mode prompt, and the one-plane solution mode prompt and the multiple-plane solution mode prompt may be selected by sequential operation of the actuators.

14. A system as in claim 12 wherein one of the modes which may be selected by the user operating the integral interface is a one-plane solution mode in which the display presents a sequence of prompts for displaying raw one-plane balance solution data.

15. A system as in claim 12 wherein one of the modes which may be selected by the user operating the integral interface is a two-plane solution mode in which the display presents a sequence of prompts for displaying raw two-plane balance solution data.

16. A system as in claim 12 wherein one of the modes which may be selected by the user operating the integral interface is a balance part mode in which the display presents a sequence of prompts for displaying information concerning which balance parts are to be installed on the engine.

17. A system as in claim 12 wherein one of the modes which may be selected by the user operating the integral interface is a balance part mode in which the display presents a sequence of prompts for displaying information concerning which balance parts are to be removed from the engine.

18. A system as in claim 17 wherein the balance part mode also presents a sequence of prompts for displaying information concerning which balance parts are to removed from the engine.

* * * * *